Jan. 22, 1924. 1,481,683
J. D. BUMP
POULTRY FOUNTAIN
Filed June 27, 1922
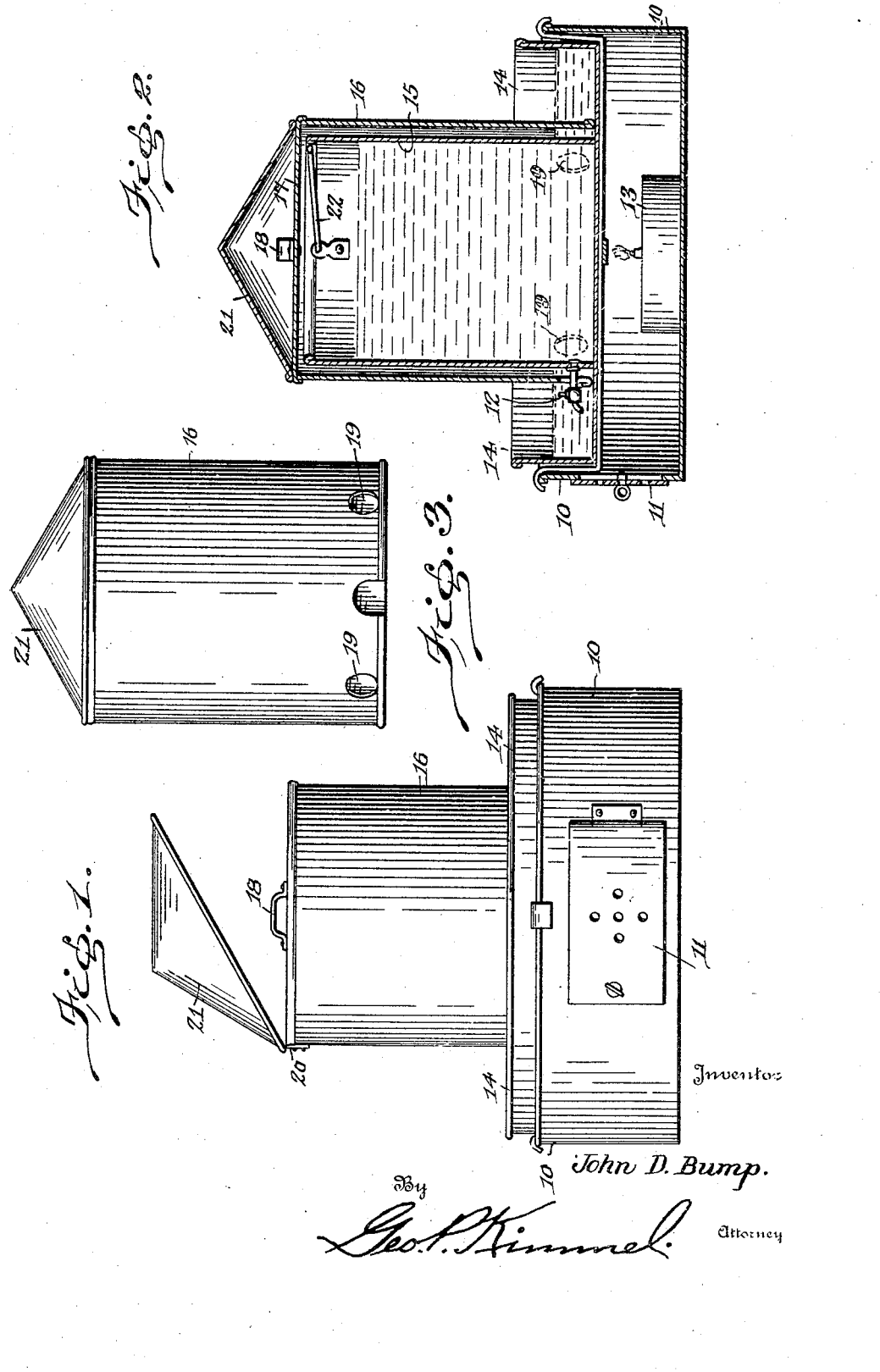
Inventor
John D. Bump.
By
Geo. P. Kimmel.
Attorney Patented Jan. 22, 1924.

1,481,683

UNITED STATES PATENT OFFICE.

JOHN D. BUMP, OF CAMERON, NEW YORK.

POULTRY FOUNTAIN.

Application filed June 27, 1922. Serial No. 571,328.

*To all whom it may concern:*

Be it known that I, JOHN D. BUMP, a citizen of the United States, residing at Cameron, in the county of Steuben and State of New York, have invented certain new and useful Improvements in Poultry Fountains, of which the following is a specification.

This invention relates to automatic stock watering devices, more particularly to devices of this character for holding water in convenient position for fowls and small animals and supplying it therefrom only so fast as required, and has for one of its objects to simplify and improve the construction and increase the convenience and utility of devices of this character.

Another object of the invention is to provide a device of this character in which the parts may be readily disconnected for cleansing and disinfecting, and in which means are provided for heating the drinking water in cold weather.

Another object of the invention is to provide a device of this character including a hood detachably connected over the supporting tank whereby the latter is protected from contamination by the fowls, and to prevent the latter from lighting thereon.

With these and other objects in view the invention consists in certain novel features of construction as hereinafter shown and described and then specifically pointed out in the claim, and in the drawings illustrative of the preferred embodiment of the invention:—

Figure 1 is a front elevation of the improved device.

Fig. 2 is a vertical sectional elevation.

Fig. 3 is an elevation of the hood member detached.

The improved device comprises a base member 10 in the form of an open top pan-like structure with an opening in one side provided with a closure 11, the latter provided with an inlet device for air. A suitable heating device is located in the base, for illustration a lamp 13, and insertible and controllable through the door closed opening.

Suspended within the open upper part of the base 10 is a relatively shallow pan-like structure 14, and rising from the member 14 is a tank or reservoir 15, the bottom of the reservoir being the intermediate portion of the member 14. The tank being smaller than the member 14, an annular space is left between the tank and the vertical walls of the member 14 and constitutes the watering trough of the improved device.

The bottom of the tank 15 is connected water tight to the bottom member of the trough, and is provided with a draw-off valve 12 downturned at the outer end so that the discharge of the valve is located constantly near the lower line of the trough and is therefore constantly immersed in the water in the trough.

The only outlet for the water from the tank is therefore through the relatively small valve 12.

A hood device bears over the tank 15 and comprises vertical walls 16, and an air tight top 17. The hood rests by its lower edge loosely upon the bottom member of the trough 14 and is provided with a lifting handle 18 attached to its top 17, and with a plurality of transverse openings 19, the upper lines of the latter being disposed constantly below the line of the upper edge of the trough.

Hinged at 20 to the top 17 of the head is a conical supplemental hood 21 to prevent the fowls from lighting on the main hood or resting thereon.

The tank 15 is provided with an inwardly folding bail 22 to facilitate handling the tank and the trough 14 attached thereto, when the latter is to be inserted or removed.

The tank 15 being open at the top, can be readily cleansed and fumigated, and the trough is also removable from the base 10 so that the latter can also be easily cleansed when required.

By this arrangement the lower edge of the hood 16 being constantly below the water line in the trough, forms a water seal, and permits the escape of water from the tank only so fast as consumed, or only when the line of the water in the trough falls below the upper line of the openings 19, as will be obvious.

The improved device is simple in construction, can be manufactured in any size or capacity and of any suitable material.

Having thus described the invention, what is claimed as new is:—

An automatic drinking fountain comprising a trough, a tank open at the upper end and connected at its lower end water tight to the bottom of the trough, a laterally directed draw off device connected to the tank below the line of the rim of the trough, and a hood closed at the upper end and enclosing the tank and bearing loosely at its lower edge upon the bottom member of the trough, said hood having a downwardly opening recess to engage over said draw off and with a plurality of transverse apertures with their upper edges below the line of the upper edge of the trough.

In testimony whereof, I affix my signature hereto.

JOHN D. BUMP.